United States Patent
Rigolet (10) Patent No.: US 10,740,136 B2
(45) Date of Patent: *Aug. 11, 2020

(54) AUTOMATIC VIRTUAL MACHINE TERMINATION IN A CLOUD

(71) Applicant: International Business Machines Corporation, Armonk, NY (US)

(72) Inventor: Jean-Yves B. Rigolet, Noisy-le-Grand (FR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 128 days.

This patent is subject to a terminal disclaimer.

(21) Appl. No.: 16/150,161

(22) Filed: Oct. 2, 2018

(65) Prior Publication Data

US 2019/0042300 A1 Feb. 7, 2019

Related U.S. Application Data

(63) Continuation of application No. 15/822,138, filed on Nov. 25, 2017, now Pat. No. 10,152,347, which is a (Continued)

(30) Foreign Application Priority Data

Nov. 9, 2012 (GB) .................................. 1220205.7

(51) Int. Cl.
*G06F 9/455* (2018.01)
*G06F 9/48* (2006.01)
*G06F 9/50* (2006.01)

(52) U.S. Cl.
CPC ...... *G06F 9/45558* (2013.01); *G06F 9/45533* (2013.01); *G06F 9/485* (2013.01); *G06F 9/5022* (2013.01); *G06F 2009/45575* (2013.01)

(58) Field of Classification Search
CPC ................................................... G06F 9/45533
(Continued)

(56) References Cited

U.S. PATENT DOCUMENTS 7,080,378 B1 * 7/2006 Noland ................. G06F 9/5083
709/224
7,343,421 B1 * 3/2008 Goyal ..................... G06F 9/468
709/238
(Continued)

FOREIGN PATENT DOCUMENTS

GB 2507779 A 5/2014

OTHER PUBLICATIONS

UK Patent Appln. GB1220205.7, Search Report, dated Apr. 15, 2013, 3 pg.
(Continued)

*Primary Examiner* — Mehran Kamran
(74) *Attorney, Agent, or Firm* — Cuenot, Forsythe & Kim, LLC (57) ABSTRACT

Managing a cloud computing environment including a plurality of resources adapted to host at least one virtual machine includes, in a virtual machine, determining a period of inactivity of the operating system for a user of the virtual machine and comparing, using a processor, the period with a defined threshold. From the virtual machine, a virtual machine termination request is sent to the cloud computing environment responsive to the period exceeding the defined threshold.

17 Claims, 5 Drawing Sheets

Related U.S. Application Data continuation of application No. 15/341,696, filed on Nov. 2, 2016, now Pat. No. 9,910,695, which is a continuation of application No. 14/071,960, filed on Nov. 5, 2013, now Pat. No. 9,558,022.

(58) Field of Classification Search
USPC .......................................................... 718/1
See application file for complete search history.

(56) References Cited

U.S. PATENT DOCUMENTS

| | | | |
|---|---|---|---|
| 8,185,893 B2 | 5/2012 | Hyser et al. | |
| 8,225,317 B1* | 7/2012 | Chiueh | G06F 9/455 713/164 |
| 8,370,844 B2* | 2/2013 | Archer | G06F 9/461 709/226 |
| 8,489,995 B2* | 7/2013 | von Eicken | H04L 67/00 709/222 |
| 8,683,548 B1* | 3/2014 | Curry | G06F 21/57 713/152 |
| 8,726,337 B1 | 5/2014 | Curry et al. | |
| 8,825,085 B1* | 9/2014 | Boyle | H04L 67/20 455/456.3 |
| 8,910,155 B1* | 12/2014 | Sobel | G06F 9/445 718/1 |
| 8,984,621 B2* | 3/2015 | Burch | G06F 9/455 726/15 |
| 8,997,093 B2 | 3/2015 | Dimitrov | |
| 9,558,022 B2 | 1/2017 | Rigolet | |
| 9,910,695 B2 | 3/2018 | Rigolet | |
| 2004/0117792 A1* | 6/2004 | Maly | G06F 9/485 718/100 |
| 2005/0160424 A1* | 7/2005 | Broussard | G06F 9/5072 718/1 |
| 2007/0002035 A1* | 1/2007 | Plut | G06F 1/3218 345/211 |
| 2007/0043860 A1* | 2/2007 | Pabari | G06F 9/5072 709/224 |
| 2007/0245348 A1* | 10/2007 | Araujo, Jr. | G06F 21/53 718/1 |
| 2008/0235596 A1* | 9/2008 | Bhogal | G06Q 10/10 715/743 |
| 2009/0235247 A1* | 9/2009 | Cho | G06F 11/3423 718/1 |
| 2009/0241030 A1* | 9/2009 | von Eicken | H04L 67/00 715/735 |
| 2009/0288084 A1* | 11/2009 | Astete | G06F 9/45533 718/1 |
| 2009/0293056 A1* | 11/2009 | Ferris | G06F 9/5077 718/1 |
| 2010/0153674 A1* | 6/2010 | Park | G06F 9/45533 711/165 |
| 2010/0217850 A1 | 8/2010 | Ferris | |
| 2010/0218170 A1* | 8/2010 | MacLellan | G06F 11/3428 717/127 |
| 2010/0235557 A1 | 9/2010 | Guo et al. | |
| 2010/0250304 A1* | 9/2010 | Whitaker | G06Q 10/0639 705/7.38 |
| 2010/0257269 A1* | 10/2010 | Clark | G06F 9/4856 709/226 |
| 2010/0325278 A1 | 12/2010 | Heim et al. | |
| 2010/0325284 A1* | 12/2010 | Heim | H04L 67/141 709/227 |
| 2011/0055372 A1 | 3/2011 | Elyashev et al. | |
| 2011/0055378 A1* | 3/2011 | Ferris | H04L 69/329 709/224 |
| 2011/0055602 A1 | 3/2011 | Kamay et al. | |
| 2011/0055830 A1* | 3/2011 | Kamay | G06F 1/3228 718/1 |
| 2011/0078572 A1* | 3/2011 | Milazzo | G06F 11/34 715/733 |
| 2011/0099267 A1 | 4/2011 | Suri et al. | |
| 2011/0117962 A1* | 5/2011 | Qiu | H04W 48/18 455/558 |
| 2011/0246627 A1 | 10/2011 | Kern | |
| 2011/0252137 A1* | 10/2011 | Stienhans | G06F 9/5083 709/224 |
| 2011/0258621 A1* | 10/2011 | Kern | G06F 9/5072 718/1 |
| 2011/0271342 A1* | 11/2011 | Chung | G06F 21/554 726/23 |
| 2011/0296019 A1 | 12/2011 | Ferris et al. | |
| 2011/0307887 A1 | 12/2011 | Huang et al. | |
| 2011/0314465 A1 | 12/2011 | Smith et al. | |
| 2012/0011506 A1 | 1/2012 | Iwamatsu et al. | |
| 2012/0011509 A1* | 1/2012 | Husain | G06F 9/5088 718/1 |
| 2012/0084262 A1* | 4/2012 | Dwarampudi | G06F 3/0665 707/667 |
| 2012/0137006 A1* | 5/2012 | Minato | G06F 9/5083 709/226 |
| 2012/0227038 A1 | 9/2012 | Hunt et al. | |
| 2013/0185717 A1* | 7/2013 | Lakshminarayanan | G06F 9/45558 718/1 |
| 2013/0227710 A1* | 8/2013 | Barak | G06F 21/10 726/29 |
| 2013/0262250 A1* | 10/2013 | Lingafelt | G06Q 30/06 705/26.1 |
| 2014/0058871 A1 | 2/2014 | Marr et al. | |
| 2014/0059228 A1 | 2/2014 | Parikh | |
| 2014/0059292 A1* | 2/2014 | Phelan | G06F 9/5088 711/113 |
| 2014/0137112 A1 | 5/2014 | Rigolet | |
| 2017/0097843 A1 | 4/2017 | Rigolet | |
| 2018/0074846 A1 | 3/2018 | Rigolet | |

OTHER PUBLICATIONS

U.S. Appl. No. 14/071,960 Non-Final Office Action, dated Jun. 25, 2015, 21 pg.

U.S. Appl. No. 14/071,960 Final Office Action, dated Dec. 2, 2015, 22 pg.

U.S. Appl. No. 14/071,960 Notice of Allowance, dated Sep. 21, 2016, 14 pg.

U.S. Appl. No. 14/071,960 Notice of Allowance, dated Oct. 24, 2017, 15 pg.

U.S. Appl. No. 15/341,696, Notice of Allowance, dated Oct. 24, 2017, 15 pg.

U.S. Appl. No. 15/822,138, Notice of Allowance, dated Aug. 2, 2018, 14 pg.

\* cited by examiner

AUTOMATIC VIRTUAL MACHINE TERMINATION IN A CLOUD

CROSS-REFERENCE TO RELATED APPLICATIONS

This application claims the benefit of Great Britain Application Number 1220205.7 filed on Nov. 9, 2012, which is fully incorporated herein by reference.

BACKGROUND

Cloud-based computing is rapidly gaining considerable interest in both consumer and business markets, as it provides remote computer resources on demand, such that the user no longer has to rely on investing in hardware to host the services, e.g., applications, required by the user. Such services can range from computer programs such as e-mail clients, word processors and the like to commercial services such as information retrieval services, web-based trading services, e.g., e-shops and the like.

A typical cloud-based computing architecture includes a cloud management server that manages access to the resources that form part of the cloud. A user typically contacts the cloud management server when requesting a particular service, which triggers the cloud management to locate a resource in the cloud that can host the requested service, e.g., by broadcasting a service request to all cloud servers. Upon locating a cloud server available to host the required service, the available cloud server will be assigned the task of hosting the requested service for the user, upon which the cloud server typically will launch an instance, e.g., a virtual machine (VM) for running the requested service. The cloud instances are usually managed in such a way that it allows users to create, update and delete the instance, either manually or by automatically by an application programming interface (API), such as Representational State Transfer (REST) or a language-specific API.

In such a cloud-based computing architecture, many VMs may be launched over a period of time. This can cause problems if the VMs are not terminated upon completion of the service, as this prevents computer resources being freed up, thus unnecessarily reducing the available capacity of the cloud. This problem is particularly prevalent in architectures in which the user is expected to terminate the VM upon delivery of the requested service, as many users tend to forget that they are responsible for such terminations, which can lead to many idle VMs being present in the architecture.

In some cases, the problem is addressed by the cloud management system inserting a self-management module into the VM, which can terminate the VM if a predefined condition is met, such as the occurrence of an error in the VM, the end of a predefined lifespan or completion of a specified duration of the VM, upon reaching a user credit limit for the use of the VM or upon an inactivity in the resources consumed or utilized by the VM. However, measuring inactivity by resource consumption is not a particularly accurate metric for determining VM inactivity, such that a risk exists that a VM may be erroneously terminated. This is of course highly unwanted, as it severely reduces the confidence the user has in the cloud computing architecture.

SUMMARY

A method of managing a cloud computing environment including a plurality of resources adapted to host at least one virtual machine. The method includes, in a virtual machine, determining a period of inactivity of the operating system for a user of the virtual machine and comparing, using a processor, the period with a defined threshold. The method further includes, from the virtual machine, sending a virtual machine termination request to the cloud computing environment responsive to the period exceeding the defined threshold.

A system for managing a cloud computing environment including a plurality of resources adapted to host at least one virtual machine. The system includes a processor programmed to initiate executable operations. The executable operations include, in a virtual machine, determining a period of inactivity of the operating system for a user of the virtual machine and comparing the period with a defined threshold. The executable operations further include, from the virtual machine, sending a virtual machine termination request to the cloud computing environment responsive to the period exceeding the defined threshold.

A computer program product for managing a cloud computing environment including a plurality of resources adapted to host at least one virtual machine. The computer program product includes a computer readable storage medium having program code stored thereon. The program code is executable by a processor to perform a method. The method includes, in a virtual machine, determining a period of inactivity of the operating system for a user of the virtual machine using the processor and comparing, using the processor, the period with a defined threshold. The method further includes, from the virtual machine, sending a virtual machine termination request to the cloud computing environment responsive to the period exceeding the defined threshold using the processor.

BRIEF DESCRIPTION OF THE SEVERAL VIEWS OF THE DRAWINGS

Preferred embodiments of the present invention will now be described, by way of example only, with reference to the following drawings, in which.

DETAILED DESCRIPTION

One or more embodiments of the present invention relate to a method of managing a cloud computing environment including a plurality of servers adapted to host at least one virtual machine.

One or more embodiments of the present invention further relate to a computer program product including a computer-readable storage medium having computer-readable program code, when executed on a computer including at least one processor, causing the at least one processor to implement the method.

One or more embodiments of the present invention yet further relate to a computer system including at least one processor adapted to execute the computer-readable program code of such a computer program product.

One or more embodiments of the present invention still yet further relate to a cloud computing environment including such a computer system.

One or more embodiments of the present invention seek to provide an improved method of virtual machine (VM) management in a cloud computing architecture.

One or more embodiments of the present invention further seek to provide a computer program product including computer program code defining such an improved VM.

One or more embodiments of the present invention yet further seek to provide a computer system adapted to execute the computer program product.

One or more embodiments of the present invention yet further seek to provide a cloud computing environment including such a computer system.

According to an aspect of the present invention, there is provided a method of managing a cloud computing environment including a plurality of resources adapted to host at least one virtual machine, the method including in a VM, determining the period of inactivity of the operating system for a user of the virtual machine; comparing the period with a defined threshold; and from the VM, sending a VM termination request to the cloud computing environment responsive to the period exceeding the defined threshold.

One or more embodiments of the present invention are based on the insight that rather than evaluation of resource use as is known in the art, a more accurate assessment of whether a VM may be terminated is obtained by evaluating the activity of the VM at the operating system level. An idle operating system is a clear indication of the user of the VM having finished using the VM, especially if the VM has not been used for at least a defined period of time.

In an embodiment, the defined threshold may be a user-defined threshold. This has the further advantage that the user can indicate after what period of non-use of the VM the VM may be terminated, thus further reducing the risk of inappropriate termination of the VM. Alternatively, the threshold may be defined by a system operator such that the user does not have to specify this threshold.

In an embodiment, the method further includes, following the comparison, requesting a list of active processes of the user from the cloud computing environment; identifying the network address assigned to the VM; and identifying the active process corresponding to the VM in the list using the identified network address; and wherein sending the request includes requesting the termination of the identified active process. This is an efficient manner for terminating the VM, which ensures that the termination of the VM is recognized at the management level of the cloud computing environment. The requesting may advantageously be performed through an API of the cloud computing environment.

The requesting a list of active processes of the user may further include embedding user credentials in the request. This is for instance necessary when the cloud computing environment can only release the list of active processes of the user upon receiving the correct authentication details for a user, e.g., user name and password.

In an embodiment, the cloud computing environment includes a management server for managing the cloud computing environment, and wherein the requesting a list of active processes of the user includes requesting the list from the management server.

In a further advantageous embodiment, the determining the period of inactivity of the operating system for a user of the virtual machine includes determining the period of inactivity of the operating system for each user of the virtual machine; and the sending a virtual machine termination request to the cloud computing environment responsive to the period of inactivity exceeding a defined threshold includes sending the request if the period of inactivity exceeds the defined threshold for each user. This ensures that a VM is only terminated if it can be guaranteed that all its users have not used the VM for the defined amount of time.

In case each user of the virtual machine has defined an individual threshold, the comparing the period of inactivity with a defined threshold may include, for each user, comparing the period of inactivity with the individual threshold of the user. This further improves the flexibility of the cloud computing environment, as single users can set their own preferences of use for a VM.

In response to the termination request, the method advantageously further includes terminating the virtual machine.

In an embodiment, the termination may be preceded by taking a snapshot of the virtual machine and storing the snapshot on the cloud computing environment. This provides useful diagnostic data that allows the evaluation of the conditions under which the VM was terminated, and allows the restoration of the VM to its state prior to termination if so required.

In accordance with another aspect of the present invention, there is provided a computer program product including a computer-readable storage medium having computer-readable program code, when executed on a computer including at least one processor, causing the at least one processor to implement the method according to one or more embodiments of the present invention.

In accordance with yet another aspect of the present invention, there is provided a computer system including at least one processor and the computer program product according to one or more embodiments of the present invention, wherein the at least one processor is adapted to execute the computer-readable program code. Such a computer system is capable of self-termination of VMs hosted thereon, which thus improves the efficiency of the computer system.

In accordance with yet another aspect of the present invention, there is provided a cloud computing environment including at least one computer system according to one or more embodiments of the present invention. Such a cloud computing environment benefits from the self-terminating functionality of the one or more VMs hosted by the one or more computer systems, such that a more resource-efficient cloud computing environment is provided.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e., is a computer-implementable method. The various steps of the method therefore reflect various parts of a computer program, e.g., various parts of one or more algorithms.

The various embodiments of the method of the present invention may be stored on a computer program product including a computer-readable storage medium. The computer-readable storage medium may be any medium that can be accessed by a computer for the retrieval of digital data from the medium. Non-limiting examples of a computer-readable storage medium include a CD, DVD, flash memory card, a USB memory stick, a random access memory (RAM), a read-only memory (ROM), a computer hard disk, a storage area network, a network server, an Internet server and so on.

Figure 1:
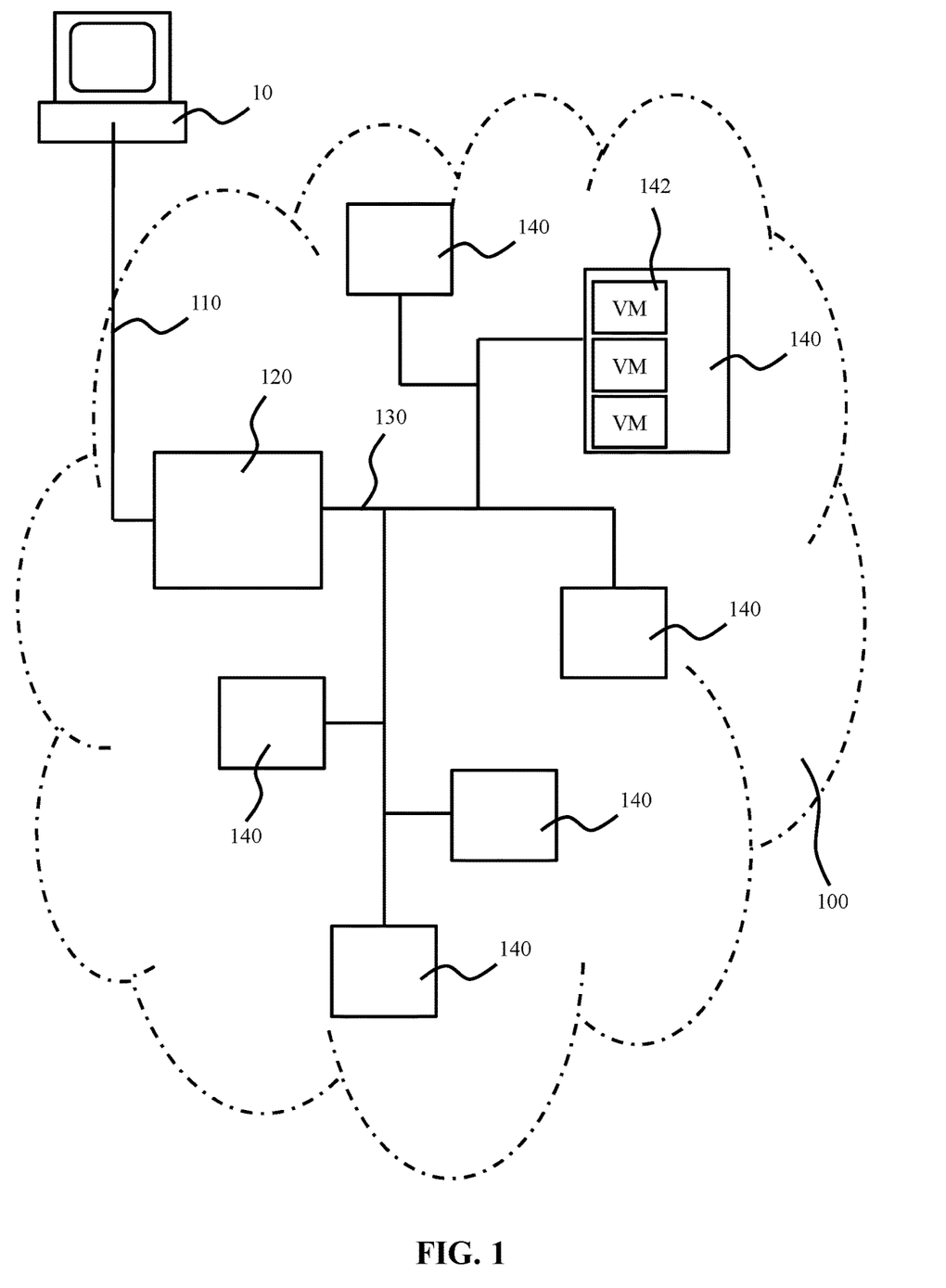
FIG. 1 schematically depicts a cloud computing environment according to an embodiment of the present invention.

FIG. 1 schematically depicts a cloud computing environment according to an embodiment of the present invention. The environment includes one or more users 10, which can send service requests to the cloud architecture 100 over a network 110, e.g., the Internet, a wired or wireless local area network (LAN) or wide area network (WAN), a mobile communications network such as a 2G, 3G or 4G network and so on.

The cloud architecture typically includes a cloud management server 120 and a number of resources 140, e.g., servers, which are connected to the management server 120 via one or more networks 130, e.g., the Internet, a wired or wireless LAN or WAN, a mobile communications network such as a 2G, 3G or 4G network and combinations thereof. The cloud management server 120 is responsible for handling service requests from the one or more users 10 and for assigning the request to a resource in the cloud architecture 120. Upon such a service request, the management server 120 will allocate the service request to one of the resources 140, for instance by broadcasting an availability request to the resources 140 and assigning the service request to a resource 140 signaling such availability. As such request handling is well-known per se, it will not be discussed in further detail for the sake of brevity. It is noted for the avoidance of doubt that any suitable service request handling protocol may be used in the cloud computing environment 100.

Upon the assignment of a request for providing a service requested by a user 10, a resource 140 may launch a new instance of the requested service or share a previously launched instance between multiple users. In the context of the present invention, an instance of such a service will be referred to as a virtual machine (VM) 142, as the user 10 will have no awareness of the underlying resource 140, but will only interact with the instance of the service that is hosted by the resource 140. As will be well-known to the skilled person, each resource 140 in the cloud computing environment 100 may be able to host different virtual machines 142 at the same time, which may offer different applications or services to one or more users 10 of the cloud computing environment 100.

As previously explained, upon completion of the requested service, the user 10 may terminate a VM 142, e.g., manually or through an API. However, in practice, many users forget to terminate the VM 142. This can cause capacity problems for the cloud computing environment 100 because it includes finite resources 140, such that idle VMs 142 reduce the availability of resources to new users 10.

In accordance with several embodiments of the present invention, this problem is addressed by including monitoring functionality in a VM 142 that can request the termination of the VM 142 from the cloud computing environment 100 without requiring any additional technology to existing cloud computing environments 100. Such monitoring functionality may be provided as an automatic task scheduler that periodically checks the idle state of the operating system of the VM 142, or as a permanently running task that regularly invokes such a check.

Figure 2:
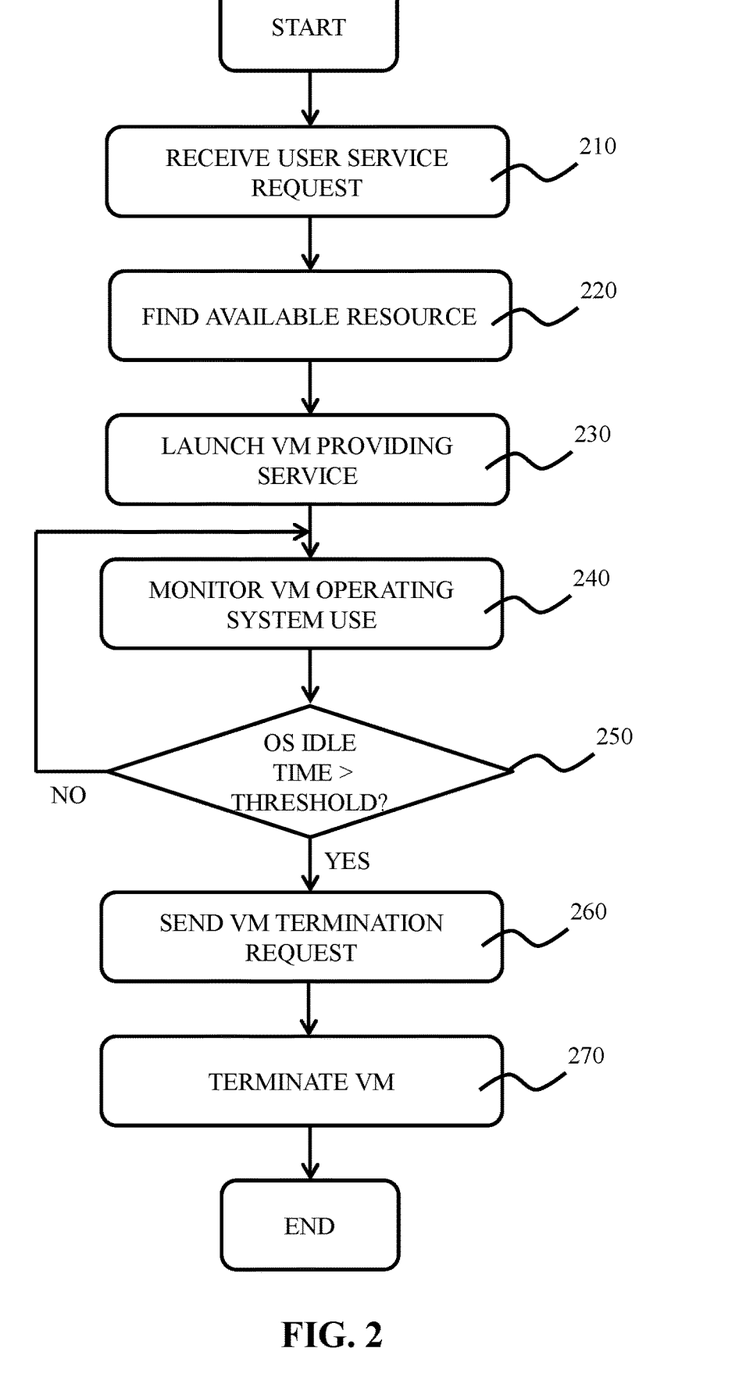
FIG. 2 depicts a flow chart of a cloud computing management method according to an embodiment of the present invention.

An embodiment of such a VM termination method is shown in the flowchart of FIG. 2. In a first step 210, the cloud computing environment 100 receives a user request for the use of a specified resource, e.g., a service as previously explained. The user request may optionally include a user-defined parameter that indicates when the resource may be terminated. More specifically, the parameter may define a minimum idle time period of the operating system of the VM 142 providing the service, which minimum idle time period is considered a reliable indication by the user that the user is no longer using the service. Alternatively, such a parameter may be omitted, in which case a system-defined parameter may be used instead as will be explained in more detail later.

Next, the cloud computing environment 100, e.g., the cloud management server 120, will allocate the user request to an available resource 140 in step 220. This may be done in any suitable manner; for instance, the cloud management server 120 may request availability of the service from the resources 140, with one or more resources 140 responding to the request by acknowledging such availability. The cloud management server 120 may select one of the resources 140 to host the requested service and notify the selected resource 140 accordingly. In an embodiment, the thus notified resource 140 will launch a VM 142 to provide the requested service in step 230. Alternatively, the notified resource 140 already has a VM 142 running that has spare capacity for handling the requested service, in which case step 230 may be omitted.

Upon identifying the resource 140 hosting the requested service, the cloud management server 120 may assign a network address, e.g., an IP address, to the VM 142 hosting service and communicate the network address to the user 10 and the resource 140 hosting the VM 142 such that the user 10 can directly access the requested service. At the same time, the cloud management server 120 may add the service requested by the user 10 to the list of active processes of the user 10 in the cloud computing environment 100.

According to an embodiment of the present invention, the operating system of the thus selected VM 142 includes an algorithm for monitoring the active use of the VM 142 by the user 10. The algorithm may form part of an automatic task scheduler or a permanently running task for monitoring the idle time of the operating system. For example, the algorithm may form part of a screen saver application or any other application that is activated after a period of idle time of the operating system.

In operation, the algorithm evaluates the idle time of the operating system of the VM 142 in step 240, and checks in step 250 if the idle time exceeds a defined threshold. This threshold may be defined by the user 10 in the form of an operating system time-out parameter as previously explained, as by a system operator based on his or her knowledge of the typical user behavior when using the cloud computing environment 100 or the service provided by the VM 142. In an embodiment, the cloud computing environment 100 may monitor such typical user behavior for individual users and define a user-specific operating system time-out threshold to be used in comparison step 250.

In an embodiment, the algorithm will periodically monitor user activity in step 240 and as long as some activity is detected, the algorithm will terminate until the next scheduled period. If no activity is detected, the algorithm will determine the duration of the inactivity of the operation system in step 250. If the period of inactivity does not exceed the defined threshold, the algorithm will again terminate and revert back to step 240 for execution during the next scheduled monitoring period.

However, if it is determined in step 250 that the operating system has been idle for a period exceeding the idle time threshold, the method will proceed to step 260 in which the cloud computing environment 100, e.g., the cloud management server 120, is requested to terminate the VM 142, after which the cloud computing environment 100, e.g., the cloud management server 120 terminates the VM 142 in step 270, e.g., by informing the resource 140 that the VM 142 is no longer required, such that the resource 140 can delete the VM 142 from its resources. At the same time, the cloud management server 120 may remove the active process associated with the VM 142 from the list of active processes associated with the user 10.

In an embodiment, the cloud computing environment 100, e.g., the cloud management server 120 or the resource 140 hosting the VM 142 may take a snapshot of the VM 142 prior to its termination. Such a snapshot typically provides an image of the VM 142, which may be stored for later use, e.g., to restore the current state of the VM 142, for instance in case a user 10 wants to resume the terminated service.

Figure 3:
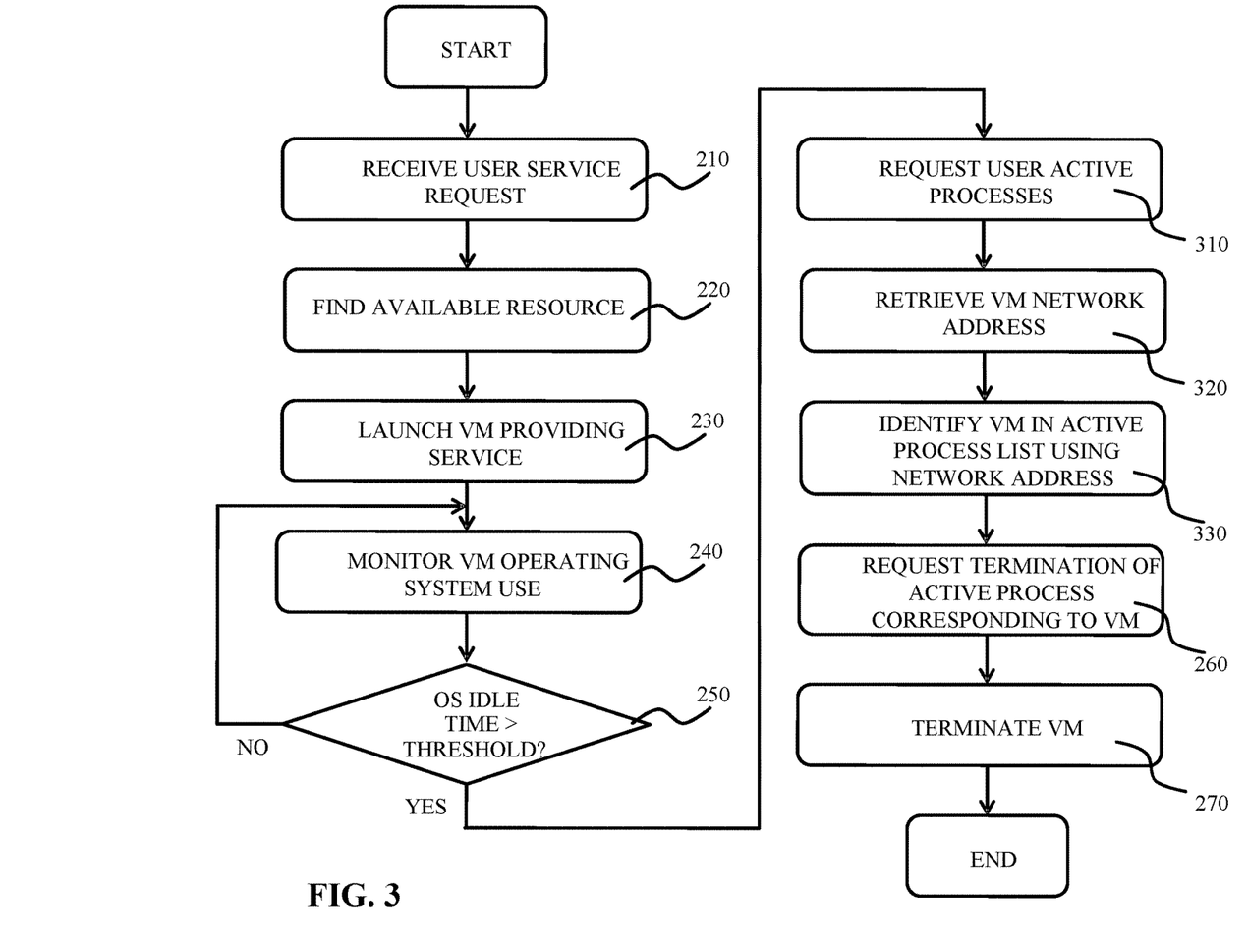
FIG. 3 depicts a flow chart of a cloud computing management method according to another embodiment of the present invention.

FIG. 3 depicts a flow chart of an embodiment of the method of the present invention in which the termination process of a VM 142 is discussed in more detail. Steps 210, 220, 240 and 250 as well as optional step 230 are identical to the steps shown in FIG. 2 and the detailed description thereof such that these steps will not be explained again for the sake of brevity. In this embodiment, the situation is addressed that a VM 142 may not be aware of the name of the process assigned by the cloud management server 120 to the service provided by the VM 142. Although this may be resolved by the VM 142 providing the cloud management server 120 with its assigned network address such that the cloud management server 120 can identify the process to be terminated, this has the drawback that the cloud management server 120 would have to include functionality that identifies an active process based on the provided network address.

As many cloud computing environments 100 facilitate the user 10 to manually or automatically terminate such processes, as previously explained, it is therefore preferable to use the existing functionality of the cloud computing environment 100, e.g., of the cloud management server 120, to terminate a VM 142 in the cloud computing environment 100. This may for instance be realized as shown in FIG. 3.

After the VM 142 has determined in step 250 that the period of inactivity of its operating system is such that it warrants terminating the VM 142, the VM 142 contacts the cloud computing environment 100, e.g., the cloud management server 120, to request the list of active processes of the user 10 in step 310. In an embodiment, this request includes the user credentials of the user 10, e.g., the user name and password of the user 10, in case the cloud computing environment 100, e.g., the cloud management server 120, is only authorized to release the requested list upon provision of the relevant user credentials. It is noted that such user credentials are typically readily available to the VM 142, as the user credentials may have been provided to the VM 142 to gain access to the requested service, e.g., when the VM 142 behaves as an isolated machine that is unaware of it being managed by the cloud management server 120. At the same time, the VM 142 may request the network address assigned to the service provided to the user 10 from its operating system or the resource 140 hosting the VM 142 in step 320.

Upon receiving the list of active processes from the cloud computing environment 100, e.g., the cloud management server 120, the VM 142 identifies in step 330 the active process associated with the network address retrieved in step 320. In other words, in step 330 the VM 142 recognizes which active process it is hosting based on the match between the network address in the received list and the network address retrieved in step 320.

Next, the VM 142 requests the termination of the identified active process in step 260 as previously explained. It is noted that this request may also include the relevant user credentials of the user 10 in case the cloud computing environment 100, e.g., the cloud management server 120, is only authorized to terminate the active process upon provision of such credentials. The cloud computing environment 100, e.g., the cloud management server 120, subsequently terminates that active process in step 270 and informs the resource 140 hosting the VM 142 that the VM 142 may be terminated.

At this point, it is noted that the procedures as disclosed in FIG. 2 and FIG. 3 and described in detail above may be amended without departing from the teachings of the present invention.

Figure 4:
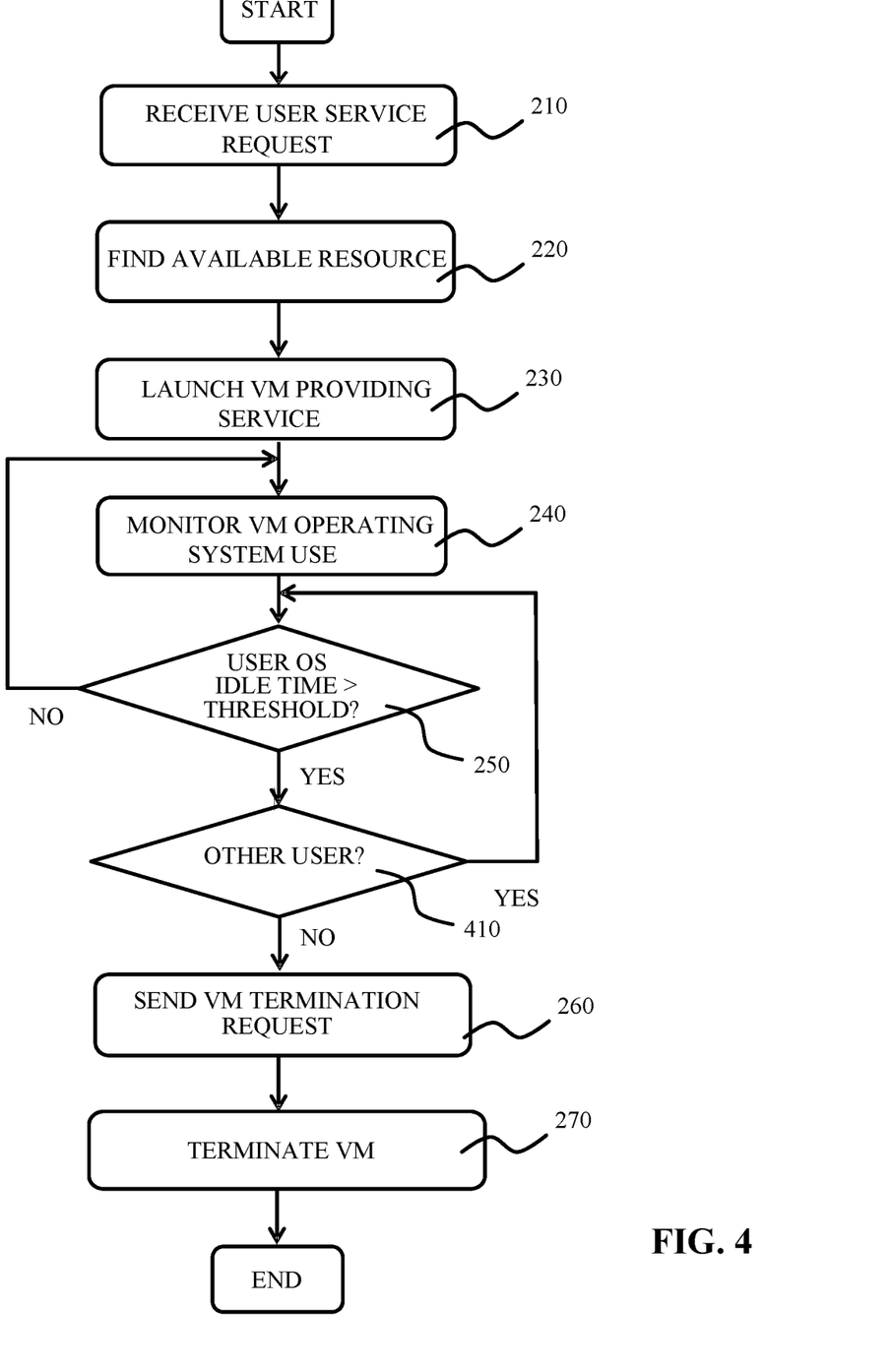
FIG. 4 depicts a flow chart of a cloud computing management method according to yet another embodiment of the present invention.

FIG. 4 depicts a flowchart of yet another embodiment of a method of the present invention, in which a VM 142 may be providing a service to a plurality of users 10. In such a scenario, the VM 142 should only be terminated if all users 10 have stopped using the VM 142. The VM 142 may learn that one of the users 10 has stopped using the service is the user 10 has informed the cloud computing environment 100, e.g., the cloud management server 120, that he or she no longer intends to use the requested service. In such a case, the cloud computing environment 100, e.g., the cloud management server 120, will inform the VM 142 that the user is to be removed from the list of users using the service. However, in a scenario where the VM 142 includes a plurality of registered users 10, the VM 142 must ensure that all users have become inactive users before a termination request can be sent to the cloud computing environment 100, e.g., the cloud management server 120.

To this end, the method as shown in FIG. 2 may be extended with an additional checking step 410, in which it is checked if the operating system idle time check in step 250 has been performed for all users. If this is not the case, the method reverts back to step 250 to check the operating system idle time for a next user, and these steps are repeated until the (in)activity of all users has been checked in this manner. The method only proceeds to step 260 to request termination of the VM 142 if it has been determined that for all users the idle time of the operating system exceeds the operating system idle time threshold.

In an embodiment, the same threshold is applied in step 250 to all users 10 registered to use the VM 142. This may for instance be a threshold defined by a system operator as previously explained. In an alternative embodiment, a user-specific threshold is applied to each individual user. For users 10 who have not provided such a threshold, the system threshold may be used instead.

Figure 5:
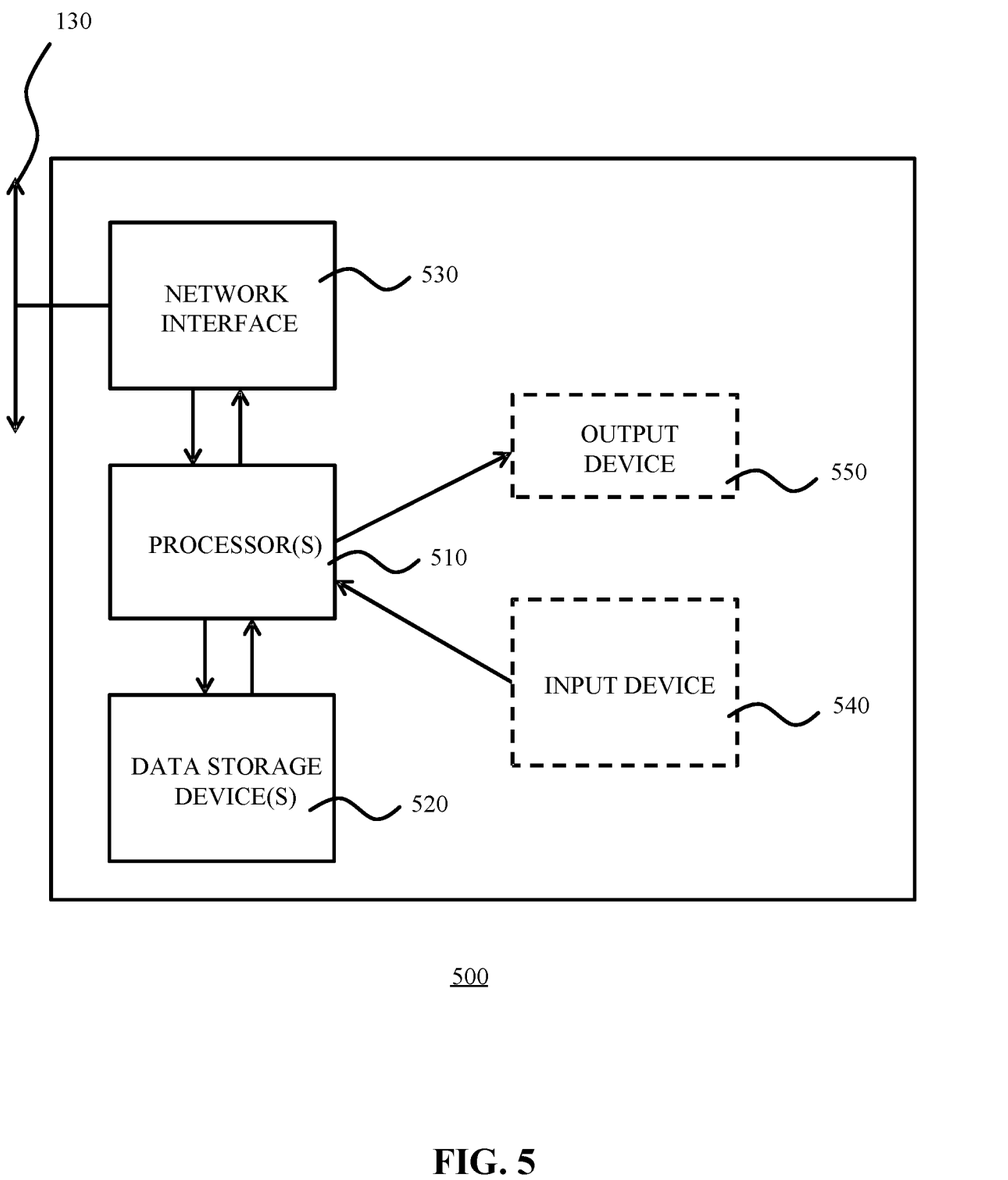
FIG. 5 schematically depicts a computer system according to an embodiment of the present invention.

FIG. 5 schematically depicts an example embodiment of a computer system 500 adapted to execute the one or more embodiments of the methods of the present invention. The computer system 500 includes one or more processors 510 that are adapted to execute program code stored in the one or more data storage devices 520 such as a memory, a hard disk drive, a distributed storage device such as a NAS or a SAN and so on. The program code, when executed on the one or more processors 510, causes the computer system 500 to implement the steps of one or more of the embodiments of the methods of the present invention as shown in FIG. 1-4 and/or described in the detailed description of FIG. 1-4. For instance, one or more processors 510 may each be adapted to host one or more virtual machines 142 including the aforementioned self-terminating functionality, the images of which may be stored on the one or more data storage devices 520.

The computer system 500 further includes a network interface 530 for communicating with the cloud computing environment 100 and the user 10, e.g., via the one or more networks 130. It is noted for the avoidance of doubt that the one or more networks 130 do not form part of the computer system 500. Such a network interface may take any suitable shape, e.g., one or more network cards.

The computer system 500 may optionally further include an input device 540, e.g., a keyboard, a mouse, a trackball, a microphone for voice recognition control, a scroll wheel, a touch screen and so on, as well as an output device 550, e.g., a display device, loudspeakers and so on.

The computer system 500 may be used in the cloud computing environment 100 of FIG. 1 as one of the resources 140 therein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a RAM, a ROM, an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been described herein for purposes of illustration, many modifications and changes will become apparent to those skilled in the art.

What is claimed is:

1. A method of managing a cloud computing environment adapted to host a virtual machine, comprising:
   determining, in the virtual machine, a period of inactivity of an operating system for a user of the virtual machine;
   requesting, from the cloud computing environment and responsive to the period exceeding a defined threshold, a list of active processes of the user;
   identifying, by the virtual machine and within the list, an active process being hosted by the virtual machine; and
   sending, from the virtual machine and to a cloud management server, a virtual machine terminal request that includes the identified active process, wherein
   the virtual machine is terminated based upon the virtual machine terminal request being received.

2. The method of claim 1, wherein
the defined threshold is defined by a system operator.

3. The method of claim 1, wherein
the active process is identified by comparing a network address assigned to the virtual machine to a network address associated to the active process.

4. The method of claim 1, wherein
the requesting the list of active processes is performed through an application programming interface of the cloud computing environment.

5. The method of claim 1, wherein
the list is requested from the cloud management server.

6. The method of claim 1, wherein
the virtual machine is terminated by the cloud management server upon the cloud management server receiving the virtual machine terminal request.

7. A computer hardware system configured to manage a cloud computing environment adapted to host a virtual machine, comprising
   a hardware processor configured to initiate the following executable operations:
     determining, in the virtual machine, a period of inactivity of an operating system for a user of the virtual machine;
     requesting, from the cloud computing environment and responsive to the period exceeding a defined threshold, a list of active processes of the user;
     identifying, by the virtual machine and within the list, an active process being hosted by the virtual machine; and
     sending, from the virtual machine and to a cloud management server, a virtual machine terminal request that includes the identified active process, wherein
   the virtual machine is terminated based upon the virtual machine terminal request being received.

8. The system of claim 7, wherein
the defined threshold is defined by a system operator.

9. The system of claim 7, wherein
the active process is identified by comparing a network address assigned to the virtual machine to a network address associated to the active process.

10. The system of claim 7, wherein
the requesting the list of active processes is performed through an application programming interface of the cloud computing environment.

11. The system of claim 7, wherein
the list is requested from the cloud management server.

12. The system of claim 7, wherein
the virtual machine is terminated by the cloud management server upon the cloud management server receiving the virtual machine terminal request.

13. A computer program product, comprising:
   a hardware storage device having program code stored thereon for managing a cloud computing environment adapted to host a virtual machine,
   the program code, which when executed by a computer hardware system, causes the computer hardware system to perform:
     determining, in the virtual machine, a period of inactivity of an operating system for a user of the virtual machine;
     requesting, from the cloud computing environment and responsive to the period exceeding a defined threshold, a list of active processes of the user;
     identifying, by the virtual machine and within the list, an active process being hosted by the virtual machine; and
     sending, from the virtual machine and to a cloud management server, a virtual machine terminal request that includes the identified active process, wherein
   the virtual machine is terminated based upon the virtual machine terminal request being received.

14. The computer program product of claim 13, wherein
the defined threshold is defined by a system operator.

15. The computer program product of claim 13, wherein
the active process is identified by comparing a network address assigned to the virtual machine to a network address associated to the active process.

16. The computer program product of claim 13, wherein
the requesting the list of active processes is performed through an application programming interface of the cloud computing environment.

17. The computer program product of claim 13, wherein
the list is requested from the cloud management server.

* * * * *